(12) United States Patent
Blake et al.

(10) Patent No.: US 8,498,481 B2
(45) Date of Patent: Jul. 30, 2013

(54) IMAGE SEGMENTATION USING STAR-CONVEXITY CONSTRAINTS

(75) Inventors: Andrew Blake, Cambridge (GB); Varun Gulshan, Oxford (GB); Carsten Rother, Cambridge (GB); Antonio Criminisi, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 603 days.

(21) Appl. No.: 12/776,082

(22) Filed: May 7, 2010

(65) Prior Publication Data

US 2011/0274352 A1   Nov. 10, 2011

(51) Int. Cl.
*G06K 9/34* (2006.01)
(52) U.S. Cl.
USPC .......................................................... 382/173
(58) Field of Classification Search
USPC .......................................................... 382/173
See application file for complete search history.

(56) References Cited

U.S. PATENT DOCUMENTS

| | | | |
|---|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |

(Continued)

FOREIGN PATENT DOCUMENTS

| | | |
|---|---|---|
| CN | 201254344 | 6/2010 |
| EP | 0583061 | 2/1994 |

(Continued)

OTHER PUBLICATIONS

Grigorescu et al. "Automated Detection and Segmentation of Large Lesions in CT Colonography." IEEE Transactions on Biomedical Engineering, vol. 57, No. 3, Mar. 2010, pp. 675-684.*

(Continued)

*Primary Examiner* — Jon Chang
(74) *Attorney, Agent, or Firm* — Zete Law, P.L.L.C.; MacLane C. Key

(57) ABSTRACT

Image segmentation using star-convexity constraints is described. In an example, user input specifies positions of one or more star centers in a foreground to be segmented from a background of an image. In embodiments, an energy function is used to express the problem of segmenting the image and that energy function incorporates a star-convexity constraint which limits the number of possible solutions. For example, the star-convexity constraint may be that, for any point p inside the foreground, all points on a shortest path (which may be geodesic or Euclidean) between the nearest star center and p also lie inside the foreground. In some examples continuous star centers such as lines are used. In embodiments a user may iteratively edit the star centers by adding brush strokes to the image in order to progressively change the star-convexity constraints and obtain an accurate segmentation.

20 Claims, 17 Drawing Sheets

U.S. PATENT DOCUMENTS

| | | | |
|---|---|---|---|
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein, Jr. |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,095,890 B2 * | 8/2006 | Paragios et al. ............... 382/173 |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |

| | | | |
|---|---|---|---|
| 8,035,624 | B2 | 10/2011 | Bell et al. |
| 8,072,470 | B2 | 12/2011 | Marks |
| 8,155,405 | B2* | 4/2012 | Unal et al. ............... 382/128 |
| 2006/0104495 | A1 | 5/2006 | Cathier et al. |
| 2008/0021502 | A1 | 1/2008 | Imielinska et al. |
| 2008/0026838 | A1 | 1/2008 | Dunstan et al. |
| 2009/0290795 | A1* | 11/2009 | Criminisi et al. ............ 382/173 |

FOREIGN PATENT DOCUMENTS

| | | |
|---|---|---|
| JP | 08044490 | 2/1996 |
| WO | WO9310708 | 6/1993 |
| WO | WO 9717598 | 5/1997 |
| WO | WO9944698 | 9/1999 |

OTHER PUBLICATIONS

Shah et al. "Iris Segmentation Using Geodesic Active Contours." IEEE Transactions on Information Forensics and Security, vol. 4, No. 4, Dec. 2009, pp. 824-836.*

Alface, et al., "Blind and Robust Watermarking of 3D Models: How to Withstand the Cropping Attack?", retrieved on Mar. 4, 2010 at <<http://ieeexplore.ieee.org/stamp/stamp.jsp?arnumber=04379866>>, IEEE, Proceedings of International Conference on Image Processing (ICIP), vol. 5, 2007, pp. V-465-468.

Bai, et al., "Geodesic Matting: A Framework for Fast Interactive Image and Video Segmentation and Matting", retrieved on Mar. 4, 2010 at <<http://www.springerlink.com/content/w1468410323h1010/fulltext.pdf>>, Springer, International Journal of Computer Vision, vol. 82, No. 1, 2009, pp. 113-132.

Bartesaghi, et al., "Tracking of Moving Objects Under Severe and Total Occlusions", retrieved on Mar. 5, 2010 at <<http://ieeexplore.ieee.org/stamp/stamp.jsp?tp=&arnumber=1529747&userType=inst>>, IEEE, Proceedings of International Conference on Image Processing (ICIP), vol. 1, 2005, pp. 301-304.

Boykov, et al., "Interactive Graph Cuts for Optimal Boundary and Region Segmentation of Objects in N-D Images", retrieved on Mar. 4, 2010 at <<http://citeseerx.ist.psu.edu/viewdoc/download;jsessionid=2C6F4B7B607DE8EFBD19884246481C6E?doi=10.1.1.129.8181&rep=rep1&type=pdf>>, Proceedings of International Conference on Computer Vision (ICCV), Vancouver, CA, vol. 1, Jul. 2001, pp. 105-112.

Criminisi, et al., "GeoS: Geodesic Image Segmentation", retrieved on Mar. 4, 2010 at <<http://research.microsoft.com/pubs/71446/Criminisi_eccv2008.pdf>>, Springer-Verlag Berlin, Lecture Notes in Computer Science vol. 5302, Proceedings of European Conference on Computer Vision: Part I (ECCV), Marseille, FR, 2008, pp. 99-112.

Das, et al., "Semiautomatic segmentation with compact shape prior", retrieved on Mar. 4, 2010 at <<http://www.utdallas.edu/~bcm052000/Interactive-Segmentation/Das-Veksler-Zavadsky.pdf>>, Image and Vision Computing, vol. 27, No. 1-2, Jan. 2009, pp. 206-219.

Duchenne, et al., "Segmentation by transduction", retrieved on Mar. 4, 2010 at <<http://www.di.ens.fr/~duchenne/article/CVPR2008.pdf>>, IEEE, Proceedings of Conference on Computer Vision and Pattern Recognition (CVPR), Jun. 2008, pp. 1-8.

Eppstein, "Hyperconvexity and Metric Embedding", retrieved on Mar. 4, 2010 at <<http://www.ics.uci.edu/~eppstein/pubs/Epp-5HWGT-09.pdf>>, William Rowan Hamilton Geometry and Topology Workshop, Dublin, IE, and IPAM Workshop on Combinatorial Geometry, UCLA, 2009, pp. 1-44.

Goldstein, et al., "Geometric Applications of the Split Bregman Method: Segmentation and Surface Reconstruction", retrieved on Mar. 4, 2010 at <<ftp://ftp.math.ucla.edu/pub/camreport/cam09-06.pdf>>, Journal of Scientific Computing (UCLA Technical Report 09-06), 2009, pp. 1-29.

Grady, "Multilabel RandomWalker Image Segmentation Using Prior Models", retrieved on Mar. 4, 2010 at <<http://cns.bu.edu/~lgrady/grady2005multilabel.pdf>>, IEEE Computer Society, Proceedings of Conference on Computer Vision and Pattern Recognition (CVPR), San Diego, CA, vol. 1, Jun. 2005, pp. 763-770.

Grady, "Random Walks for Image Segmentation", retrieved on Mar. 5, 2010 at <<http://ieeexplore.ieee.org/stamp/stamp.jsp?tp=&arnumber=1704833>>, IEEE Transactions on Pattern Analysis and Machine Intelligence, vol. 28, No. 11, Nov. 2006, pp. 1768-1783.

Gulshan, et al., "Geodesic Star Convexity for Interactive Image Segmentation", IEEE Conference on Computer Vision and Pattern Recognition (CVPR), Jun. 2010, pp. 1-8.

Katz, et al., "Hierarchical Mesh Decomposition using Fuzzy Clustering and Cuts", retrieved on Mar. 4, 2010 at <<http://webee.technion.ac.il/~ayellet/Ps/0325_ayt.pdf>>, ACM, International Conference on Computer Graphics and Interactive Techniques, San Diego, CA, 2003, pp. 954-961.

Kohli, et al., "Simultaneous Segmentation and Pose Estimation of Humans using Dynamic Graph Cuts", retrieved on Mar. 4, 2010 at <<http://eprints.pascal-network.org/archive/00005450/01/IJCV_revised.pdf>>, International Conference on Computer Vision (IJCV), Kyoto, JP, vol. 79, No. 3, 2008, pp. 85-298.

Kumar, et al., "OBJ Cut", retrieved on Mar. 4, 2010 at <<http://www.robots.ox.ac.uk/~vgg/publications/papers/kumar05.pdf>>, IEEE Computer Society, Proceedings of Conference on Computer Vision and Pattern Recognition (CVPR), vol. 1, 2005, pp. 18-25.

Lempitsky, et al., "Image Segmentation by Branch-and-Mincut", retrieved on Mar. 5, 2010 at <<http://66.102.9.132/search?q=cache%3An2jKgDPOQzUJ%3Aresearch.microsoft.com%2Fen-us%2Fum%2Fpeople%2Fvictlem%2Feccv2008.pdf+Image+Segmentation+by+Branch-and-mincut&hl=en>>, Springer-Verlag Berlin, Lecture Notes in Computer Science vol. 5305, Proceedings of European Conference on Computer Vision (ECCV), 2008, pp. 15-29.

Liu, et al., "Paint Selection", retrieved on Mar. 5, 2010 at <<http://research.microsoft.com/en-us/um/people/jiansun/papers/paintselection_siggraph09.pdf>>, ACM, Transactions on Graphics (TOG), vol. 28, No. 3, Aug. 2009, pp. 1-7.

Meier, et al., "Parameter Space Warping: Shape-Based Correspondence Between Morphologically Different Objects", retrieved on Mar. 4, 2010 at <<http://ieeexplore.ieee.org/stamp/stamp.jsp?arnumber=00981232>>, IEEE Transactions on Medical Imaging, vol. 21, No. 1, Jan. 2002, pp. 31-47.

Nowozin, et al., "Global Connectivity Potentials for Random Field Models", retrieved on Mar. 4, 2010 at <<http://kyb.mpg.de/publications/attachments/nowozin2009cvpr_5828%5B0%5D.pdf>>, IEEE Computer Society, Proceedings of Conference on Computer Vision and Pattern Recognition (CVPR), 2009, pp. 818-825.

O'Rourke, "Art Gallery Theorems and Algorithms", retrieved on Mar. 4, 2010 at <<http://maven.smith.edu/~orourke/books/ArtGalleryTheorems/Art_Gallery_Full_Book.pdf>>, Oxford University Press, 1987, pp. 1-296.

Rhemann, et al., "A Perceptually Motivated Online Benchmark for Image Matting", retrieved on Mar. 4, 2010 at <<http://research.microsoft.com/pubs/80299/cvpr09-matting-Eval.pdf>>, IEEE Computer Society, Conference on Computer Vision and Pattern Recognition (CVPR), Miami, FLA, Jun. 2009, pp. 1826-1833.

Rother, et al., "GrabCut—Interactive Foreground Extraction using Iterated Graph Cuts", retrieved on Mar. 4, 2010 at <<http://delivery.acm.org/10.1145/1020000/1015720/p309-rother.pdf?key1=1015720&key2=6786421611&coll=GUIDE&dl=GUIDE&CFID=3792524&CFTOKEN=66471657>>, ACM, Transactions on Graphics (TOG), vol. 23, No. 3, Aug. 2004, pp. 309-314.

Sinop, et al., "A Seeded Image Segmentation Framework Unifying Graph Cuts and Random Walker Which Yields a New Algorithm", retrieved on Mar. 4, 2010 at <<http://citeseerx.ist.psu.edu/viewdoc/download?doi=10.1.1.93.6438&rep=rep1&type=pdf>>, Proceedings of International Conference on Computer Vision (ICCV), Rio de Janeiro, BR, Oct. 2007, pp. 1-8. 1-1.

Slabaugh, et al., "Graph Cut Segmentation Using an Elliptical Shape Prior", retrieved on Mar. 4, 2010 at <<http://www.gregslabaugh.name/publications/ellipseGraphCutsICIP2005.pdf>>, IEEE International Conference on Image Processing (ICIP), vol. 2, Sep. 2005, pp. 1-4.

Stylianou, et al., "Crest Lines for Surface Segmentation and Flattening", received on Mar. 4, 2010 at <<http://ieeexplore.ieee.org/stamp/stamp.jsp?tp=&arnumber=1310279>>, IEEE Transactions on Visualization and Computer Graphics, vol. 10, No. 5, Sep. 2004, pp. 536-544.

Szummer, et al., "Learning CRFs using Graph Cuts", retrieved on Mar. 4, 2010 at <<http://www.cs.uiuc.edu/homes/dhoiem/publications/eccv08GraphcutCRFs.pdf>>, Springer-Verlag Berlin, Lecture Notes in Computer Science vol. 5303, Proceedings of European Conference on Computer Vision (ECCV), Marseille, FR, 2008, pp. 582-595.

Veksler, "Star Shape Prior for Graph-Cut Image Segmentation", retrieved on Mar. 4, 2010 at <<http://www.csd.uwo.ca/faculty/olga/Papers/eccv2008Final.pdf>>, Springer-Verlag Berlin, Lecture Notes in Computer Science vol. 5304, Proceedings of European Conference on Computer Vision: Part III (ECCV), Marseille, FR, 2008, pp. 454-467.

Vicente, et al., "Graph cut based image segmentation with connectivity priors", retrieved on Mar. 4, 2010 at <<http://www.cs.ucl.ac.uk/staff/V.Kolmogorov/papers/connectedGC-CVPR08.pdf>>, IEEE Conference on Computer Vision and Pattern Recognition (CVPR), 2008, pp. 1-8.

Aggarwal et al., "Human Motion Analysis: A Review", IEEE Nonrigid and Articulated Motion Workshop, 1997, University of Texas at Austin, Austin, TX.

Azarbayejani et al., "Visually Controlled Graphics", Jun. 1993, vol. 15, No. 6, IEEE Transactions on Pattern Analysis and Machine Intelligence.

Breen et al., "Interactive Occlusion and Collusion of Real and Virtual Objects in Augmented Reality", Technical Report ECRC-95-02, 1995, European Computer-Industry Research Center GmbH, Munich, Germany.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

Freeman et al., "Television Control by Hand Gestures", Dec. 1994, Mitsubishi Electric Research Laboratories, TR94-24, Caimbridge, MA.

Granieri et al., "Simulating Humans in VR", The British Computer Society, Oct. 1994, Academic Press.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

He, "Generation of Human Body Models", Apr. 2005, University of Auckland, New Zealand.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

"Interactive Simulation and Training", 1994, Division Incorporated, 6 pages.

Isard et al., "Condensation—Conditional Density Propagation for Visual Tracking", 1998, pp. 5-28, International Journal of Computer Vision 29(1), Netherlands.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Kohler, "Special Topics of Gesture Recognition Applied in Intelligent Home Environments", In Proceedings of the Gesture Workshop, 1998, pp. 285-296, Germany.

Kohler, "Technical Details and Ergonomical Aspects of Gesture Recognition applied in Intelligent Home Environments", 1997, Germany.

Kohler, "Vision Based Remote Control in Intelligent Home Environments", University of Erlangen-Nuremberg/Germany, 1996, pp. 147-154, Germany.

Livingston, "Vision-based Tracking with Dynamic Structured Light for Video See-through Augmented Reality", 1998, University of North Carolina at Chapel Hill, North Carolina, USA.

Miyagawa et al., "CCD-Based Range Finding Sensor", Oct. 1997, pp. 1648-1652, vol. 44 No. 10, IEEE Transactions on Electron Devices.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Qian et al., "A Gesture-Driven Multimodal Interactive Dance System", Jun. 2004, pp. 1579-1582, IEEE International Conference on Multimedia and Expo (ICME), Taipei, Taiwan.

Rosenhahn et al., "Automatic Human Model Generation", 2005, pp. 41-48, University of Auckland (CITR), New Zealand.

Shao et al., "An Open System Architecture for a Multimedia and Multimodal User Interface", Aug. 24, 1998, Japanese Society for Rehabilitation of Persons with Disabilities (JSRPD), Japan.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Virtual High Anxiety", Tech Update, Aug. 1995, pp. 22.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Zhao, "Dressed Human Modeling, Detection, and Parts Localization", 2001, The Robotics Institute, Carnegie Mellon University, Pittsburgh, PA.

* cited by examiner

| 1=NW | 2=N | 3=NE |
|------|-----|------|
| 8=W  | 0   | 4=E  |
| 7=SW | 6=S | 5=SE |

IMAGE SEGMENTATION USING STAR-CONVEXITY CONSTRAINTS

BACKGROUND

Image segmentation involves partitioning a digital image into two or more sets of pixels (or other image elements). For example a label may be assigned to each image element so that image elements with the same label share at least some visual characteristics and image elements with different labels differ with respect to those visual characteristics. In this way a foreground of an image may be separated from a background for example, or objects and boundaries may be located. Image segmentation is a difficult and complex problem and there is a need to improve the quality and speed of image segmentation systems.

Examples of applications in which image segmentation is used are medical imaging, locating objects in satellite images, face recognition, fingerprint recognition, machine vision and many others.

Interactive segmentation in which a user imposes certain constraints for segmentation by specifying certain image elements that are either part of an object of interest or part of the background has become popular in different domains as it can reduce the ambiguity of segmentation caused by complex object appearance. However, user interaction can often be cumbersome requiring many interactions and repeated brush strokes in order to segment an image. User guided image segmentation may also be effortful and time consuming for the user and is often difficult to carry out by novice users.

There is a need to provide interactive image segmentation that will segment an image with greater speed and less user interaction than current systems. For example, to power assist a human user in cutting out a desired object from an image in a robust manner.

The embodiments described below are not limited to implementations which solve any or all of the disadvantages of known image segmentation systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Image segmentation using star-convexity constraints is described. In an example, user input specifies positions of one or more star centers in a foreground to be segmented from a background of an image. In embodiments, an energy function is used to express the problem of segmenting the image and that energy function incorporates a star-convexity constraint which limits the number of possible solutions. For example, the star-convexity constraint may be that, for any point p inside the foreground, all points on a shortest path (which may be geodesic or Euclidean) between the nearest star center and p also lie inside the foreground. In some examples continuous star centers such as lines are used. In embodiments a user may iteratively edit the star centers by adding brush strokes to the image in order to progressively change the star-convexity constraints and obtain an accurate segmentation.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 15 shows 9 back-link indices;

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an interactive image segmentation system, the system described is provided as an example and not a limitation. As those skilled in the art will appreciate, the present examples are suitable for application in a variety of different types of image and video processing systems.

The term "geodesic distance" is used herein to refer to a distance between two points in an image which takes into account image content. For example, consider the intensities of the image elements as a height map. The shortest geodesic distance between two points in an image may then be one that travels around a region of high intensity rather than a Euclidean shortest path which travels "as the crow flies". In an embodiment described herein the geodesic distances take into account intensity gradients in an image. However, it is also possible to use geodesic distances which take into account gradients of other sources of information, such as texture gradients, color gradients, or gradients of probability maps.

The term "image element" is used to refer to a pixel, group of pixels, or other higher level component of an image.

Figure 1:
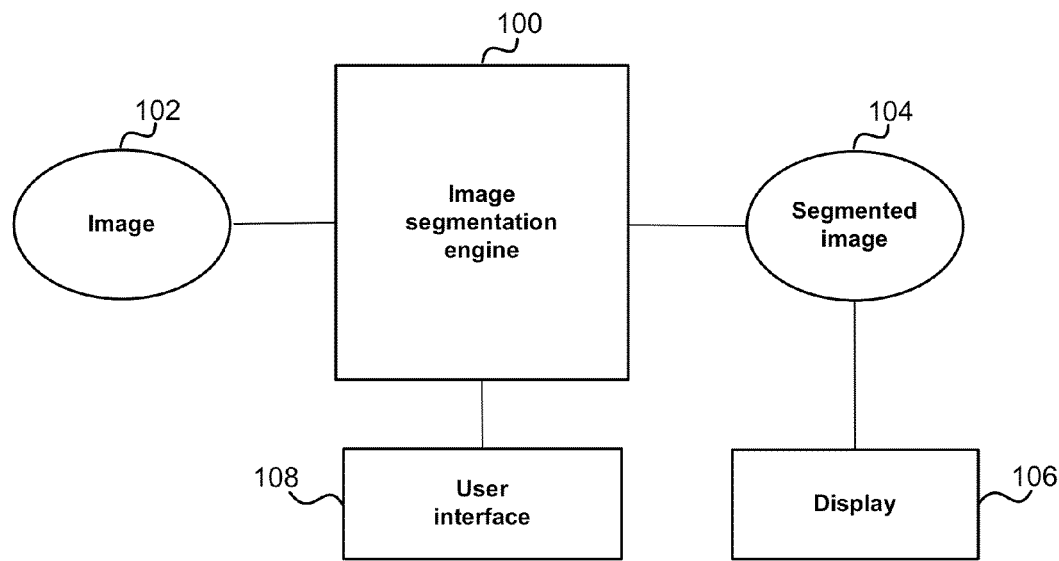
FIG. 1 is a schematic diagram of an image segmentation system.

FIG. 1 is a schematic diagram of an image segmentation system comprising a computer-implemented image segmentation engine 100, a display 106 and a user interface 108. The image segmentation engine 100 has an input arranged to receive an image 102 to be segmented. A non-exhaustive list of examples of images that may be used as input is a color image, a grayscale image, a medical image or any other type of digital image. The input image may have more than 2 dimensions. For instance it can be a 3D medical volume such as magnetic resonance imaging (MRI) data, computed tomography (CT) data, other higher dimensional medical image data or sequence of images such as a video.

The image segmentation engine 100 is arranged to carry out segmentation of the image data 102. Segmentation comprises partitioning a digital image into two or more sets of image elements. For example, this may be to extract an object from the image by labeling all image elements within the object with the same label and all image elements in a background with another label. In an example the object is a foreground object and the user may wish to segment the object from the image background. The space of possible segmentations is huge and this makes image segmentation such a difficult task. In the embodiments described herein the image segmentation engine uses a type of shape constraint to restrict the space of possible segmentations to a smaller subset in order to reduce false segmentations. The shape constraint used is referred to herein as a star-convexity constraint which is explained in more detail below.

The image data 102 is processed by the segmentation engine 100 to form a segmented image 104 that is stored in a data structure at the segmentation engine or at any other appropriate location. The output segmented image 104 can be displayed on any appropriate display 106 such as a display screen or other display device. The display screen can be directly connected to the image segmentation engine 100 or alternatively can be situated remotely from the image segmentation engine 100. A user interface 108, for example a graphical user interface (GUI), can be used to display the input image data and output segmented image. The user interface 108 can also be used for displaying user input specifying at least one image location in the image as a star center. The user input may be input from a keyboard, a mouse, a touch screen or any other appropriate method of receiving user input.

In an embodiment a user views an image in the user interface 108 and inputs information specifying at least some image elements which are in the foreground and/or background of the image 104. The input may be made using a brush or lasso tool, by selecting a contour or box or by any other appropriate method at the user interface 108. The image segmentation engine 100 then computes a segmented image 104 using the input. In an embodiment the user may use different brush tools to select the foreground of the image and the background of the image. A shape constraint is imposed based on the user input and globally optimal segmentation solutions are achieved subject to the shape constraint. In other embodiments user input is not required and the image segmentation engine 100 automatically selects appropriate star centers, for example, by using pre-specified star center locations.

Preferably the image segmentation engine 100 is implemented at a CPU. However, it may be implemented at a GPU or any other appropriate processor.

In examples described herein, by incorporating prior knowledge about the shape of an object (a shape prior) the segmentation engine is more robust as it is able to rule out segmentations inconsistent with the prior. For example, the shape constraint may be that the foreground segment is a star convex shape. An object has a star shape if for any point p inside the object all the points on a straight line between the center c and point p also lie inside the object. An object has a convex star shape if for any point inside the object, all points on a line between the center c and p lie inside the object. The term "star-convexity constraint" is used herein to refer to a condition that an image segment is a convex star shape.

The lines between the center c and point p of a star convex shape may be Euclidian or Geodesic. In an example an object that is star convex is a region of interest in an image such as a foreground object region and the star convexity can be used as a constraint in order to allow the image segmentation engine to efficiently segment the image.

The star convexity constraint is flexible in the set of shapes it allows. It is not based on a shape of a specific object class such as square or triangle but is based on the geometric properties of an object.

Figure 2:
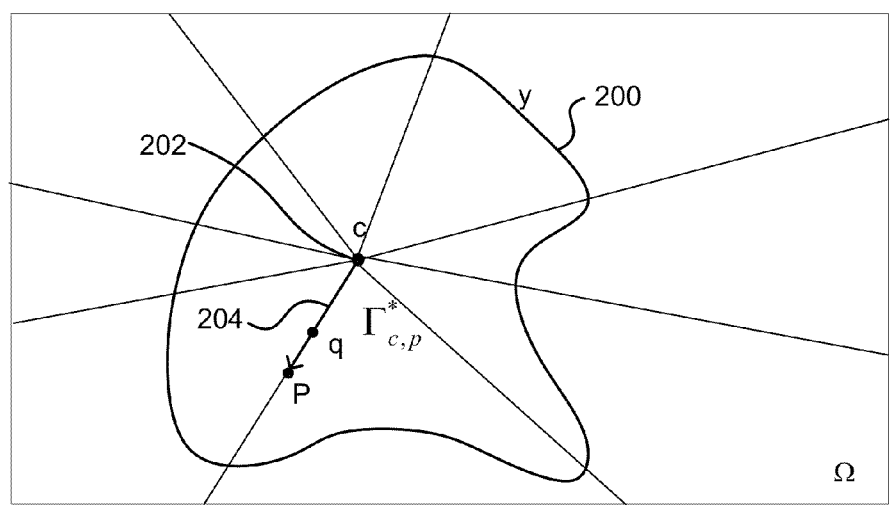
FIG. 2 is a schematic diagram of star convexity.

FIG. 2 is a schematic diagram of star convexity. An object 200 is star convex with respect to the center c 202 if for every point p in the object all the points on a line $\Gamma^*_{c,p}$ 204 between that point and the center also lie inside the object. A point p is said to be visible to the center 202 via a set y if the line $\Gamma^*_{c,p}$ 204 joining p to c lies in the set y. A set y (the object in this example) is star-convex with respect to centre C 202 if every point p∈y is visible to c via y.

The set of all shapes which are star-convex with respect to the center C 202 can be denoted by $S^*(\{c\})$. The star convexity constraint can be expressed as an energy $$E^*(y \mid c) = \begin{cases} 0 & \text{if } y \in S^*(\{c\}) \\ \infty & \text{if } y \notin S^*(\{c\}). \end{cases}$$

The set $y \subseteq \Omega$ can also be represented as a function $y: \Omega \to \{0,1\}$, where $\Omega$ is the domain of the image and $\forall p \in \Omega$: $p \in y \Leftrightarrow y_p = 1$. The energy $E^*(y|C)$ can be expressed with pairwise terms. For the line $\Gamma^*_{c,p}$ joining p to c, the star convexity constraints are written as $$\forall q \in \Gamma^*_{cp}(y_p, y_q), E^*_{p,q}(y_p, y_q) = \begin{cases} \infty & \text{if } y_p = 1 \text{ and } y_q = 0 \\ 0 & \text{otherwise} \end{cases}$$

$$E*(y \mid c) = \sum_{p \in \Omega} \sum_{q \in \Gamma^*_{cp}} E^*_{p,q}(y_p, y_q).$$

The energy is submodular as the labeling ($y_p=1, y_q=0$) has an ∞ energy and satisfies the submodularity criteria.

In an example the domain $\Omega$ is discrete and points p and q correspond to image elements. In a further example the lines $\Gamma^*_{c,p}$ 204 are rasterized versions of continuous lines. The star convexity constraint may be imposed only between 8-connected neighboring image elements (p,q) thus enabling it to be implemented efficiently.

Figure 3:
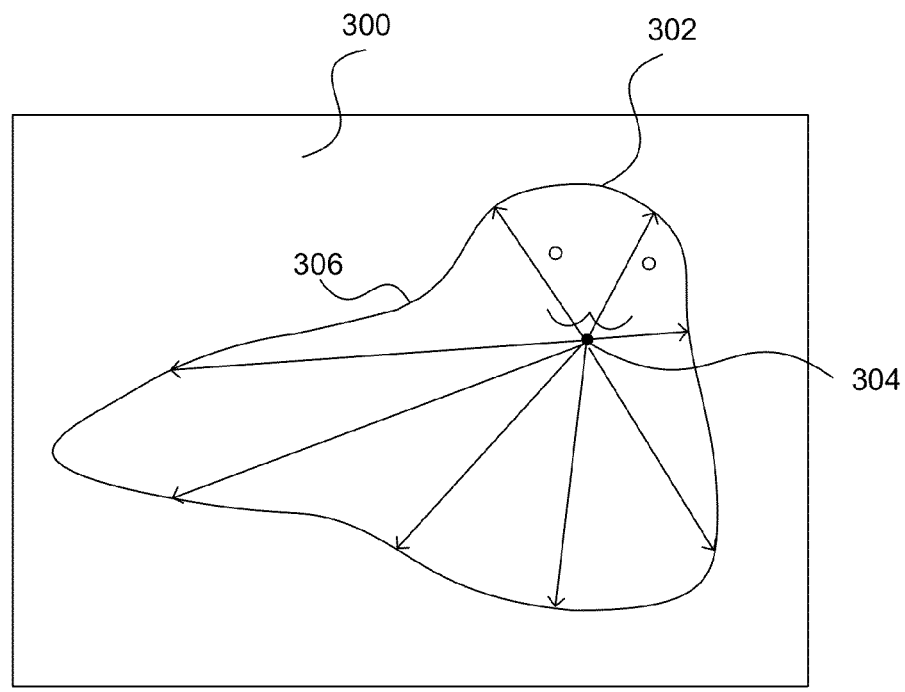
FIG. 3 is a schematic diagram of an example of a star convex object.

FIG. 3 is a schematic diagram of an example of a star convex object 302. The background 300 is separated from the object of interest 302 using a star center 304. All of the points within the object of interest are visible to the star center c as a line joining any point within the object 302 to c lies in the set y. The object of interest may be any shape as long as this criterion is fulfilled. In an embodiment the user can choose any point inside the object 302 as a star center 304 since a convex shape is a star with respect to any inside point. In a further embodiment there are a plurality of valid star centers. In the embodiments described herein the user does not have to be careful about selecting the star center 304. In a further example the center may be selected by the segmentation system using automated techniques. An example of an automated technique that can be used is probabilistic definition.

Figure 4:
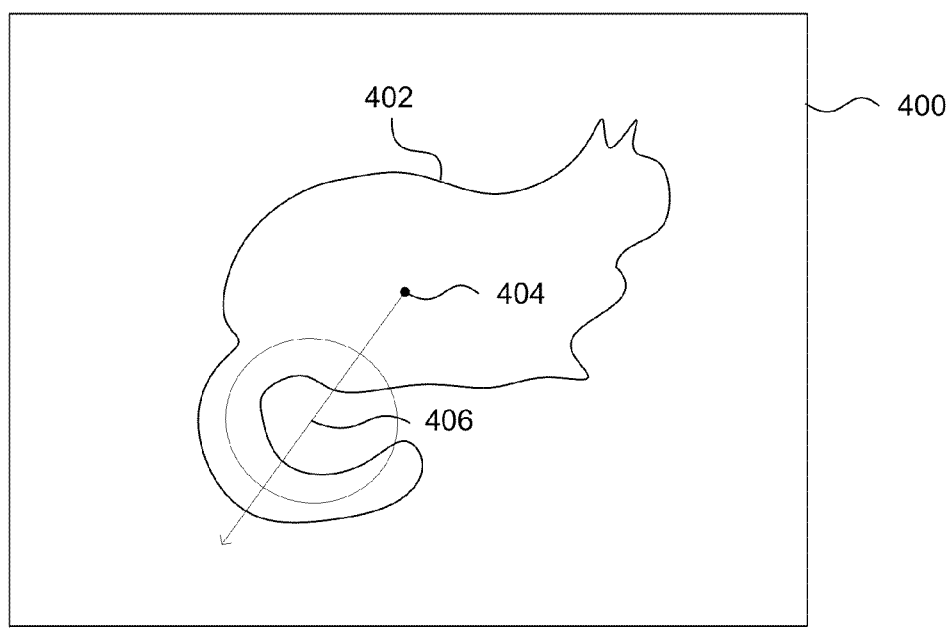
FIG. 4 is a schematic diagram of an example of a non star convex object.

FIG. 4 is a schematic diagram of an example of a non star convex object 402. An input image 400 depicts an object 402 which is a cat with a curled tail. A plausible star center 404 is shown for the object with a region that prohibits visibility circled 406. Deviations from star convexity can be caused by, in an example, the fine details of an object. Finely detailed, complex or composite structures can result in points that are not visible to the star center c as the line joining any point within the object 402 to c does not lie in the set y. In the example object 402 the curvature of the cat's tail means that points on the cat's tail are not visible to the star center c as the image joining any point within the object 402 to c does not lie in the set y. In another example deviations from star convexity can be caused by gross deviations due to multiple object instances.

Figure 5:
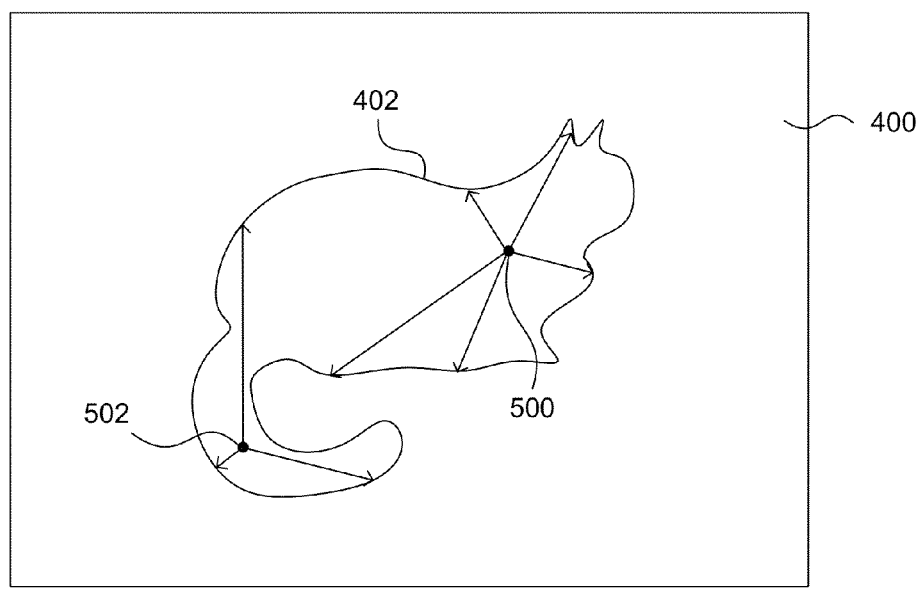
FIG. 5 is a schematic diagram of using multiple stars to define an object for segmentation.

An extension of single star convexity is to use multiple stars to define a more general class of shapes. FIG. 5 is a schematic diagram of using multiple stars to define an object for segmentation. An object 402 in an image 400 can be segmented with respect to two star centers 500, 502.

In an example a set y is star-convex with respect to $\{c_1, c_2\}$ if every point p∈y is visible to at least one of the star centers 500, 502 via y. This can be expressed as a finite union of star shaped sets. A set y is star-convex with respect to $\{c1, c2\}$ if $\exists y_1 y_2 \subseteq \Omega$ s.t. $y = y_1 \cup y_2$ and $y_1 \in S^*(\{c_1\})$ and $y_2 \in S^*(\{c_2\})$. The star convexity constraint for multiple star centers can be expressed as $$E^*(y | \{c_1, c_2\}) = \min_{y_1, y_2} E^*(y_1 | c_1) + E^*(y_2 | c_2) + \delta_y(y_1 \cup y_2)$$

$$\delta_y(y_1 \cup y_2) = \begin{cases} 0 & \text{if } y = (y_1 \cup y_2) \\ \infty & \text{otherwise} \end{cases}$$

where $E^*(y_1|c_1)$ and $E^*(y_2|c_2)$ are defined by $$E^*(y|c) = \sum_{p \in \Omega} \sum_{q \in \Gamma^*_{cp}} E^*_{p,q}(y_p, y_q).$$

In this example the energy is not submodular which makes the segmentation more computationally costly. An embodiment using an alternative interpretation of multiple stars which is submodular and computationally tractable is described herein with reference to FIG. 6.

Figure 6:
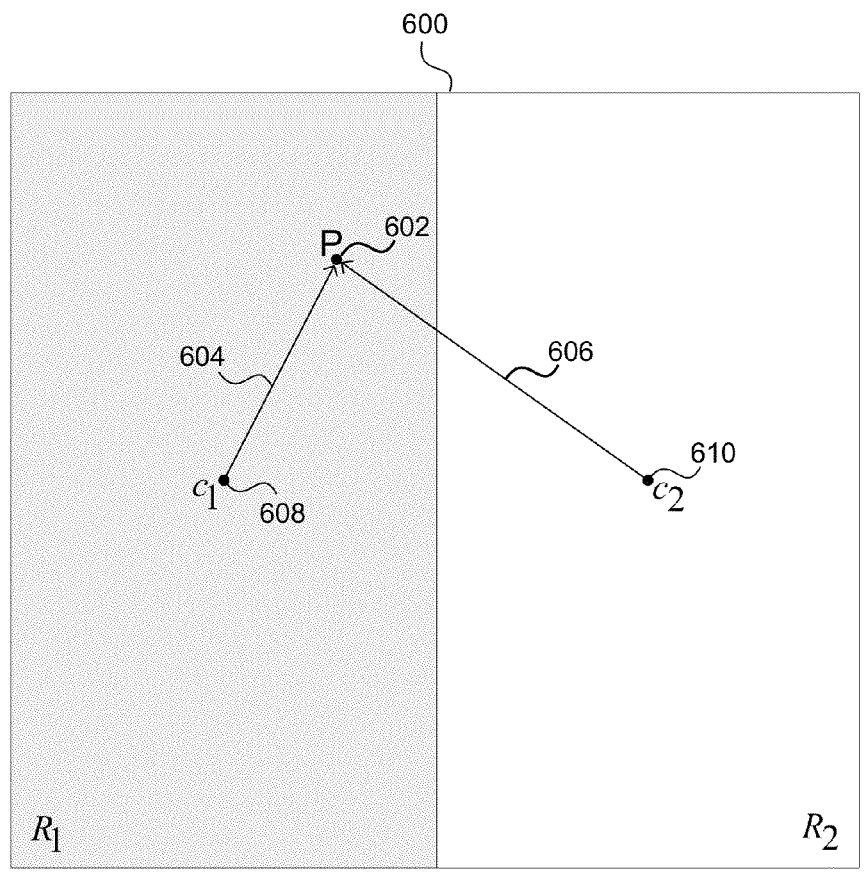
FIG. 6 is a schematic diagram of imposing star convexity on rays based on visibility to the nearest star center.

FIG. 6 is a schematic diagram of imposing star convexity on lines based on visibility to the nearest star center. An image 600 contains a point p 602. Star convexity is imposed on one of the lines 604, 606 based on whether point p 602 is closer to center $c_1$ 608 or center $c_2$ 610. In an example the image 600 is split into two fields $R_1, R_2$. If the point p 602 is in field $R_1$ such that p∈$R_1$ then the point is closer to center $c_1$ 608 and star convexity is imposed on the line 604 $\Gamma^*_{c,p}$. Conversely if the point p 602 is in field $R_2$ such that p∈$R_2$ then the point is closer to center $c_2$ 610 and star convexity is imposed on the line 606 $\Gamma^*_{c2,p}$.

Figure 7:
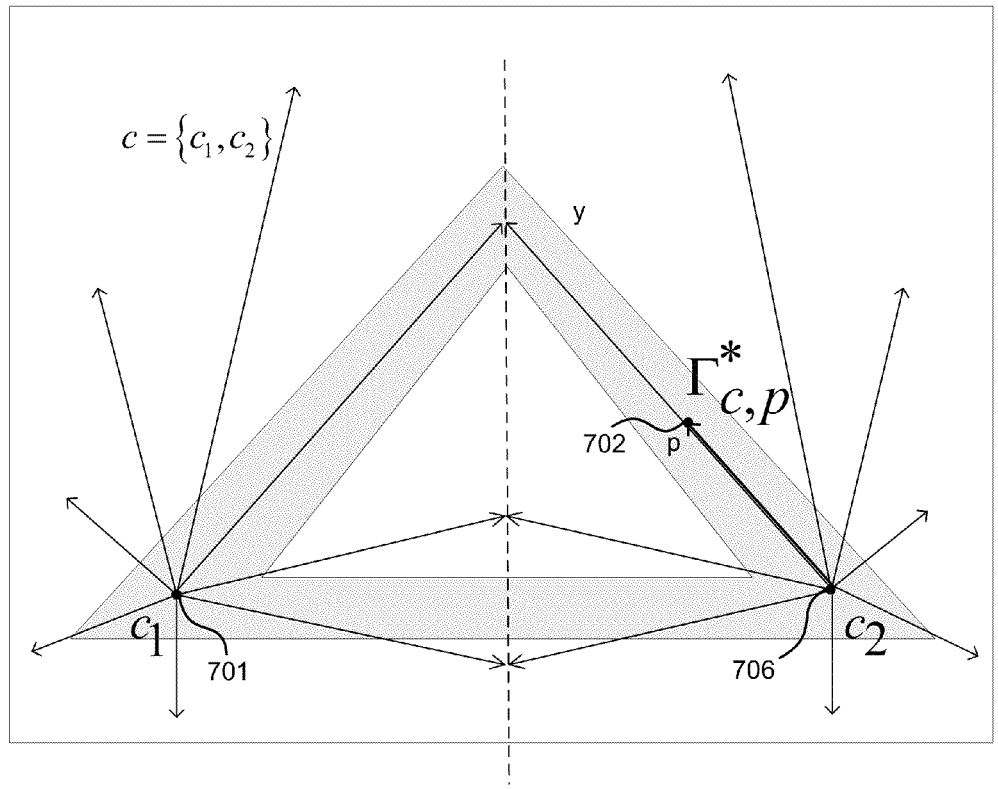
FIG. 7 is a schematic diagram of star convexity imposed on a set of discrete star centers.

The definition of the line joining star center c to p (denoted $\Gamma^*_{c,p}$) is extended to the line joining the set of star centers c to p (denoted $\Gamma^*_{c,p}$). $\Gamma^*_{c,p}$ is the shortest line between point p and center c. $\Gamma^*_{c,p}$ is defined as the shortest line between point p and set c=$\{c_1, c_2\}$ $$c(p) = \underset{c \in c}{\operatorname{argmin}} d(c, p), \Gamma^*_{c,p} = \Gamma^*_{c(p),p}$$

Where d(c,p) is the Euclidean distance between c and p and c(p) denotes the closest star center to point p FIG. 7 is a schematic diagram of star convexity imposed on a set of discrete star centers. Each point 702 p∈y is be visible to its nearest star center c(p) 701, 706. The star energy E*(y|c) can be written exactly as above for two star centers with the shortest path defined as above. The star energy remains submodular which improves tractability when compared with the imposition of the condition that a point p should be visible to at least one star center.

Figure 8:
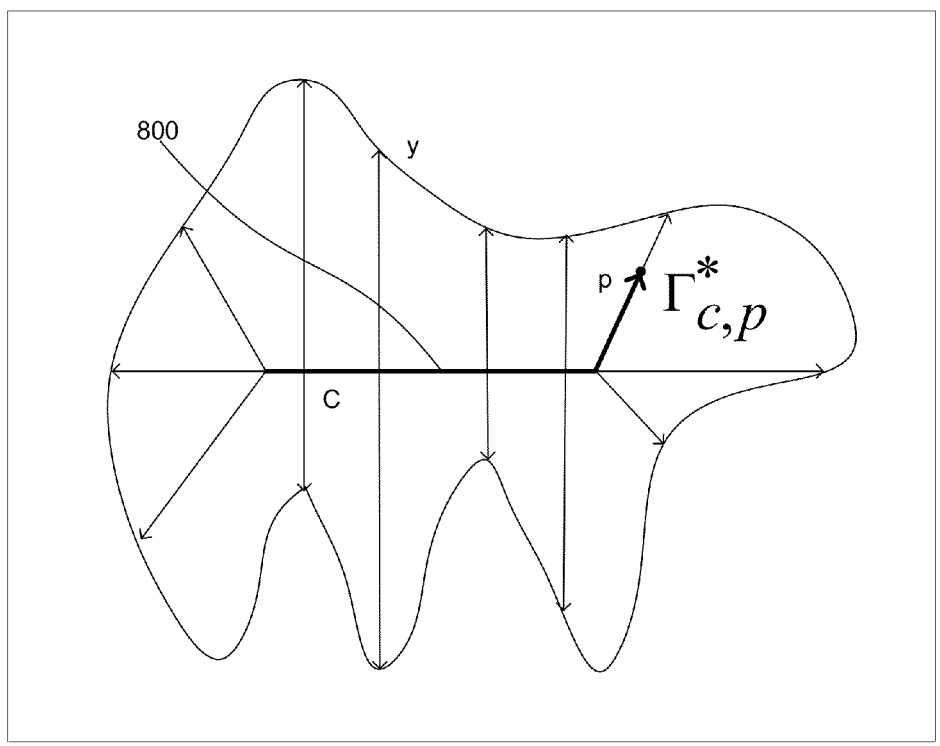
FIG. 8 is a schematic diagram of star convexity imposed on set of continuous star centers.

FIG. 8 is a schematic diagram of star convexity imposed on set of continuous star centers. The definitions described above with reference to FIG. 6 and FIG. 7 extend to an infinite set of star centers. In an embodiment a brush stroke 800 input by a user may be used as a continuous star center. This allows user input to be simplified.

Figure 9:
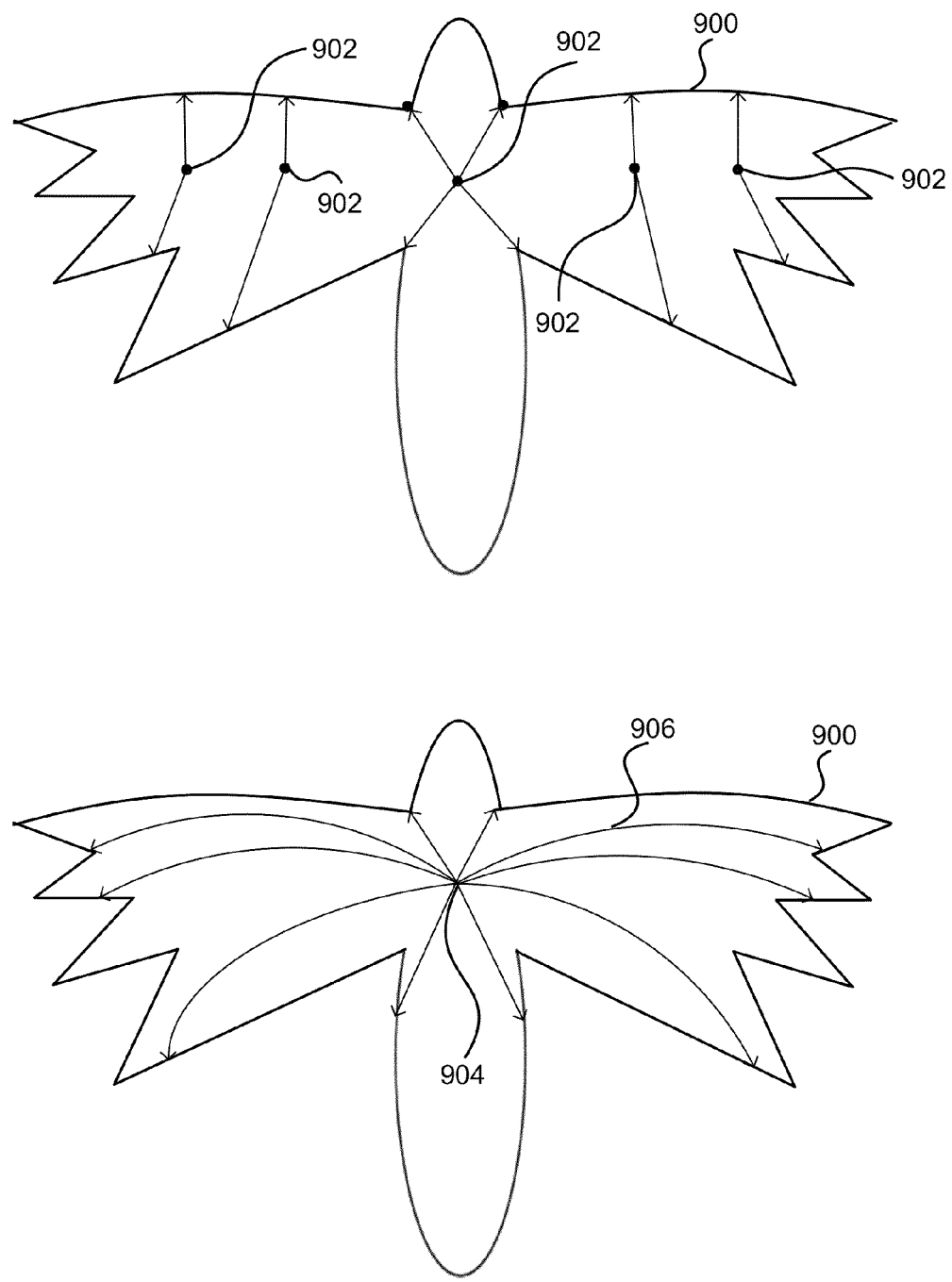
FIG. 9 is a schematic diagram of multiple star convexity and geodesic star convexity.

FIG. 9 is a schematic diagram of multiple star convexity and geodesic star convexity. In an example where the object 900 to be segmented has a significant amount of fine detail or complex structure one possible method of carrying out the segmentation is to use multiple star centers 902. A further method is to use a single star center 904 with geodesic lines 906.

In an example such as a bird where the object to be segmented 900 has a large amount of fine detail or complex structure it may require many star centers 902 to segment the object using Euclidean rays or images. Geodesic lines 906 can bend and adapt to the image data as opposed to straight Euclidean rays thus extending the visibility and reducing the number of star centers required. In an example this allows the image to be segmented with only limited user input and also reduces the computational cost of segmenting the image.

Figure 10:
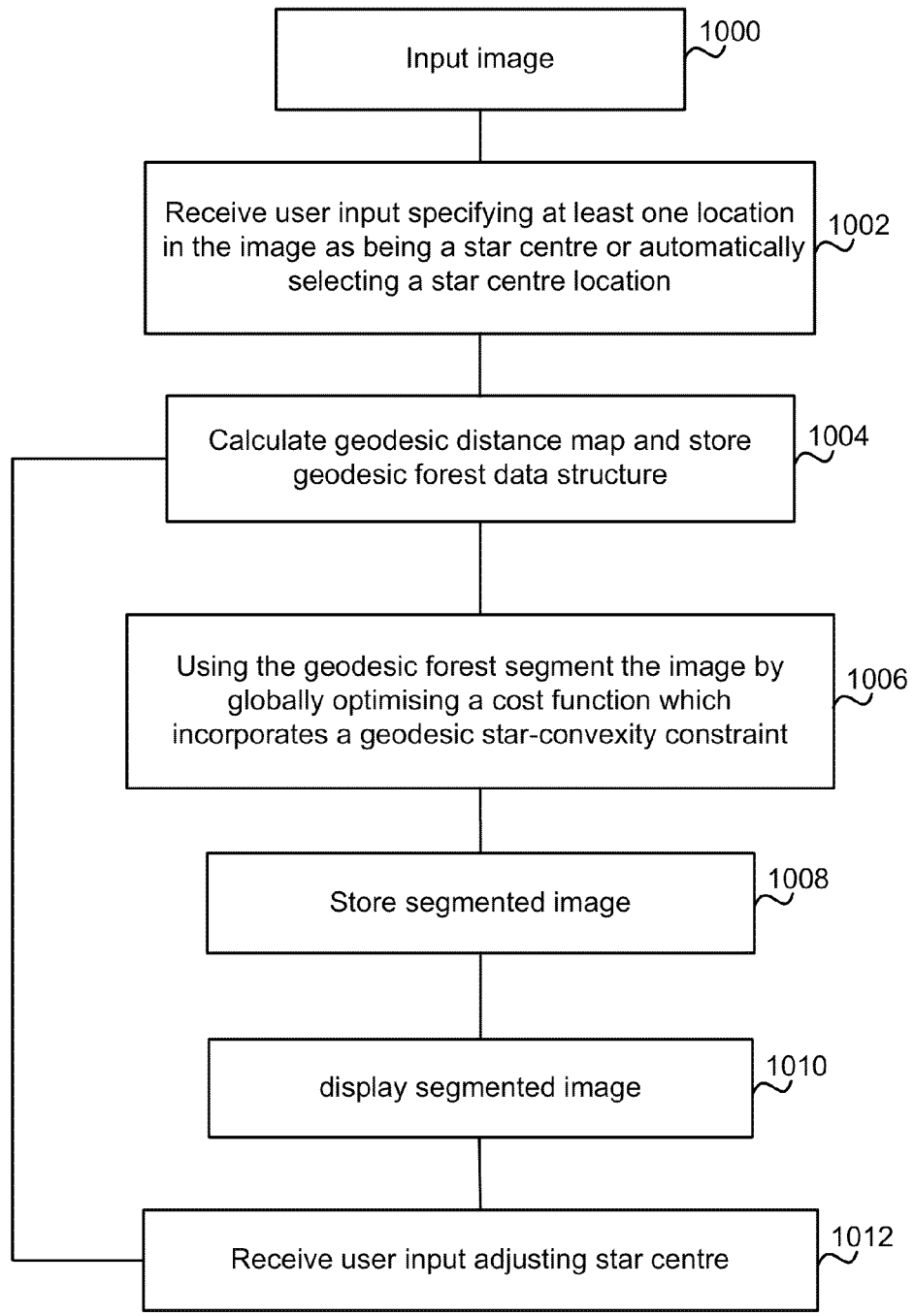
FIG. 10 is a flow diagram of a method of image segmentation using geodesic star convexity.

FIG. 10 is a flow diagram of image segmentation using geodesic star convexity. An input image is received 1000 for segmentation. User input is received 1002 specifying at least one location in the image as being a star center, alternatively the star center can be selected automatically. A geodesic distance map is calculated 1004 and the geodesic distance map is used to segment 1006 the image by globally optimizing a cost function which incorporates a geodesic star convexity constraint. The segmented image is stored 1008 and displayed 1010 and further user input can be received 1012 adjusting the star center. The image segmentation can then be recomputed using the further user input.

A non-exhaustive list of examples of images that may be received 1000 as input is a color image, a grayscale image, a medical image or any other type of image. The input image may have more than 2 dimensions. For instance it can be a 3D medical volume such as magnetic resonance imaging (MRI) data, computed tomography (CT) data or other medical data or sequence of images such as a video The user input received 1002 may be input from a keyboard, a mouse, a touch screen or any other appropriate method of receiving user input. The input may be in the form of a brush or lasso tool, selecting a contour or box or any other appropriate method. It may also be possible to find the globally optimal location of star centers automatically. In an example "Branch-and-mincut" techniques may be used. In another example probabilistic methods can be used. The user does not have to specify the star center exactly as most points within an appropriate convex shape constraint can be used. In another example a continuous center as described herein with reference to FIG. 8 can be used.

The geodesic distance map can then be calculated 1004. A geodesic distance transform may be used to determine the geodesic distances. Any suitable geodesic distance transform (GDT) may be used and an example of a known geodesic distance transform is set out below for ease of reference.

The geodesic distance map may comprise a geodesic distance value at each image element, being the shortest geodesic distance from that image element to the nearest star center (or other specified point or region, which may be defined probabilistically). The gradients in the underlying image provide information to compute geodesic distances. The gradients in the image may be intensity, color, or other gradients. The length of a discrete line is defined as $$L(\Gamma) = \sum_{i=1}^{n-1} \sqrt{(1-\gamma_g)\delta(\Gamma^i, \Gamma^{i+1})^2 + \gamma_g \|\nabla(I\Gamma^i))\|^2}$$

where $\Gamma$ is an arbitrary parameterized discrete image with n pixels given by $\{\Gamma^1, \Gamma^2, \ldots, \Gamma^n\}$, $d(\Gamma^i, \Gamma^{i+1})$ is the Euclidean distance between successive pixels and the quantity $\|\nabla I(\Gamma^i)\|^2$ is a finite difference approximation of the image gradient between the points $(\Gamma^i, \Gamma^{i+1})$. The parameter $y_g$ weights the Euclidean distance with the geodesic length. Using the above definition, a geodesic distance may be defined as $$d_g(a,b) = \min_{\Gamma \in P_{a,b}} L(\Gamma), \; \Gamma^*_{a,b} = \arg\min_{\Gamma \in P_{a,b}} L(\Gamma)$$

where $P_{a,b}$ denotes a set of all discrete paths (sequences of image elements) between two grid points a and b. In an example, calculation is in the discrete domain including the shortest lines $\Gamma^*_{a,b}$. A rasterization step can then optionally be omitted while setting up the star energy which decreases computation time. In examples setting the parameter $y_g=0$ results in a Euclidean shape (albeit in discrete domain) and $y_g=1$ relies solely on image gradients. In examples, the image gradients may be rescaled such that the average gradient is the same as the average Euclidean distance between neighboring image elements.

The definition of geodesic distance between two points also extends to distance between a set of points c and a point p. If every point $p\in\Omega$ were connected to the star center c using the shortest geodesic lines $\Gamma^*_{c,p}$ the structure obtained is a collection of trees rooted at c known as a geodesic forest. Larger values of the parameter $y_g$ yield fewer trees with bendier and more convoluted branches.

Any suitable methods may be used to compute the geodesic distances and form a geodesic forest data structure. For example, in cases where the star center is defined exactly a GPU algorithm for computing geodesic distances may be used. However, this is not essential; any suitable method may be used.

Geodesic forest data structures are very efficient to compute using shortest image algorithms (O(n log n)) with n being the number of image elements. The geodesic forest data structure representation requires relatively small memory use (even for high resolution images), and no large speed reduction is observed for larger images. The star energy $E^*(y|c)$ may now be written $E^*(y|x,c)$ as it depends on the underlying image x.

Figure 14:
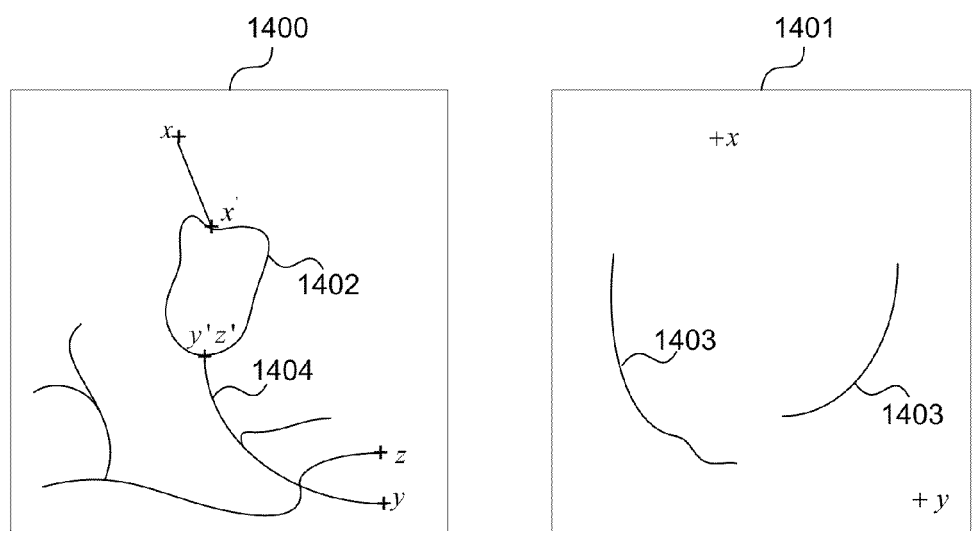
FIG. 14 is a schematic diagram of a geodesic distance map of an image and an intensity gradient map of the same image.
Figure 15:
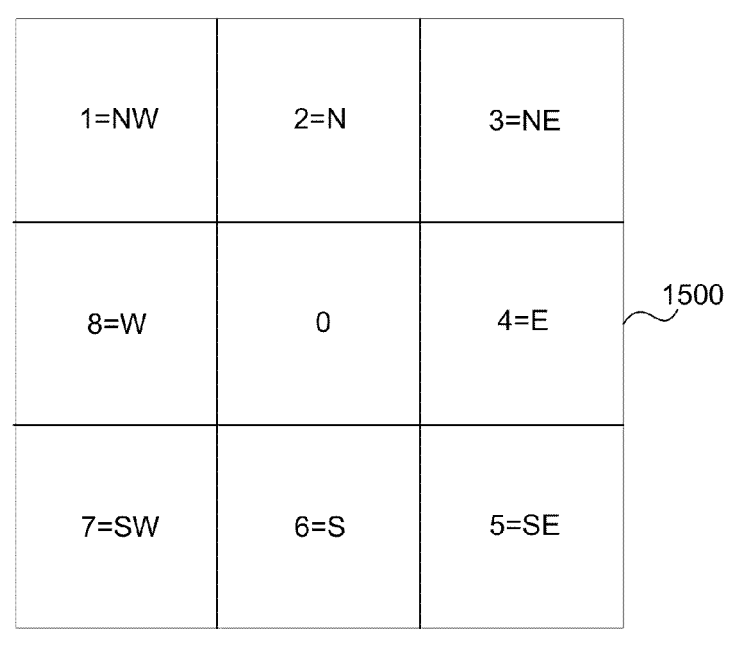
Figure 16:
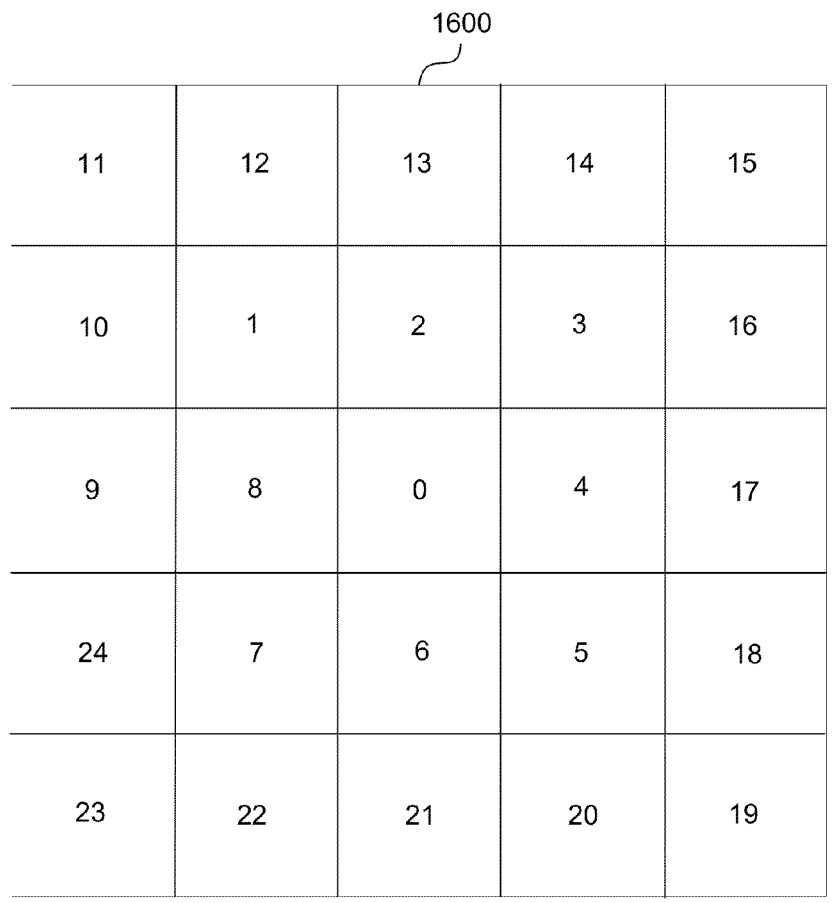
FIG. 16 shows 25 back-link indices.

More detail about computing a geodesic forest data structure is given below with reference to FIGS. 14 to 16.

In an example the star-convexity constraint can be combined with an energy function which expresses the segmentation problem. An example energy function for an image segmentation problem is now described. However, any appropriate energy formulation may be used. An energy function may be optimized:

$$E(y|x) = \sum_{i\in\Omega} U(y_i|x) + \lambda \sum_{(i,j)\in N} V(y_i y_j|x)$$

$$y^* = \arg\min_{y\in Y} E(y|x)$$

where x denotes an image to be segmented, $\Omega$ is the set of all image elements, $\lambda$ is a weighting on the pairwise terms and N represents the set of neighboring image element-pairs. The data term $U(y_i|x)$ may be computed using the negative log likelihood of color models learned from user inputs (or preconfigured), and the pairwise terms are contrast dependent terms $V(y_i|y_j|x)=\exp(-\beta\|x_i-x_j\|^2)$. The color models may use Gaussian Mixture Models (GMMs) for foreground and background. In an example the GMMs have five components each for foreground and background but there may be more components or less components. In examples where the user input is sparse the GMMs can be mixed with uniform color models.

Now star convexity constraints are added. The energy can be optimized subject to y being star convex $$\min_y E(y|x) \Leftrightarrow \min_y E(y|x) + E^*(y|x,c)$$

$$\text{s.t.} \; y \in S^*(c).$$

It is possible to obtain the global minima efficiently as both $E^*(y|x)$ and $E^*(y|x,c)$ are submodular. The star convexity constraint restricts the space of shapes. For an n×n pixel image, the cardinality of the unconstrained output space is reduced significantly to $O(n^n)$. The segmented image can be stored 1008 and displayed 1010. In a non-limiting list of examples the image can be stored 1008 on a hard disk or in RAM memory or on any other appropriate storage device either locally or remotely. The display on which the image is displayed 1010 can be any appropriate display, such as a computer screen, television or mobile device.

Figure 11:
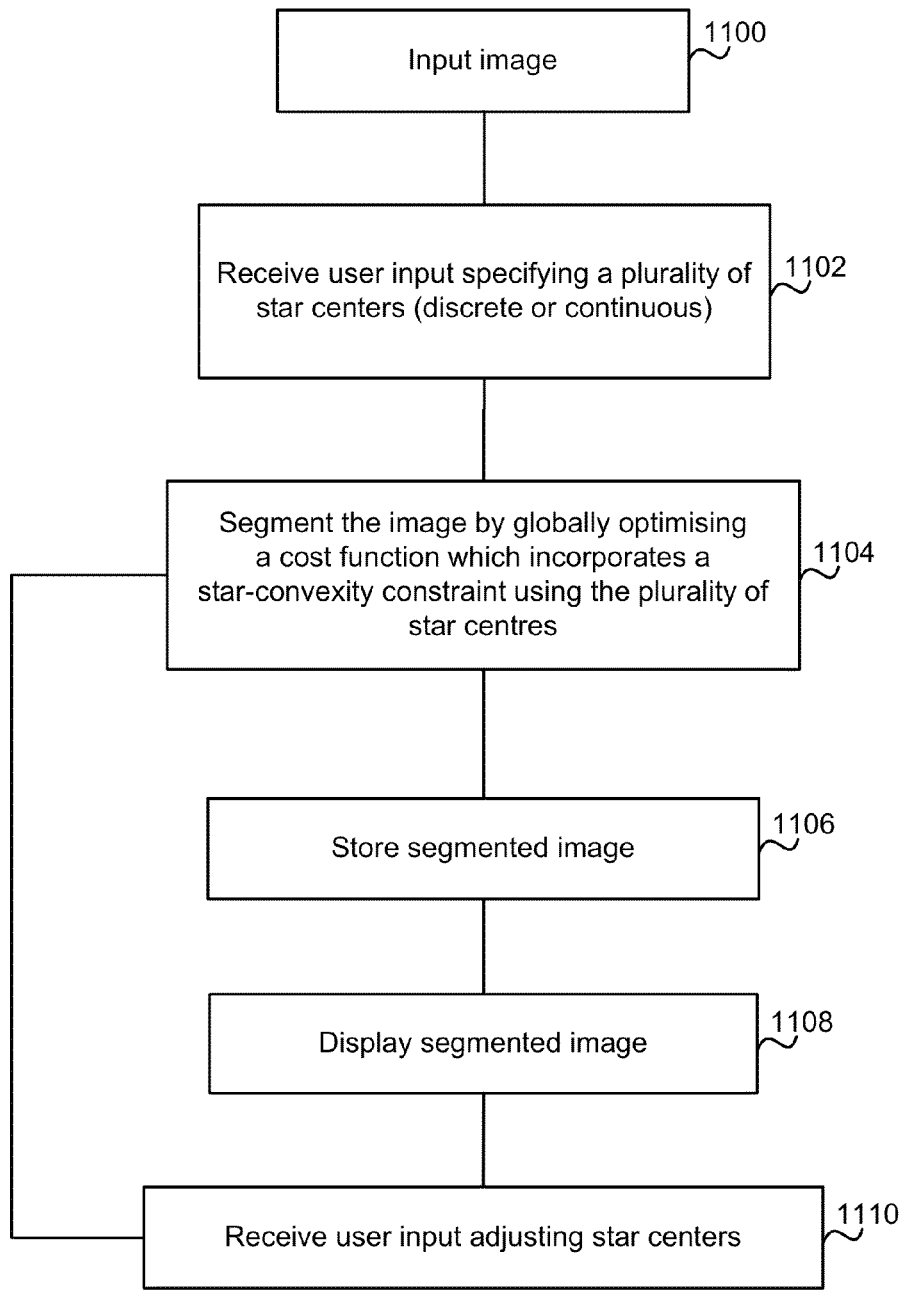
FIG. 11 is a flow diagram of a method of image segmentation using multiple star centers.

FIG. 11 is a flow diagram of a method at an image segmentation system using a plurality of star centers. An input image 1100 to be segmented is received as described above for FIG. 10. User input specifying a plurality of star centers, which may be discrete or continuous is received 1102. For example, a user may make a brush stroke on a display of the input image at a graphical user interface. The brush stroke may define a continuous star center. In another example, a user may use a mouse to click at different locations, thereby specifying multiple star center positions. Other forms of user input may be used to specify the star centers. It is also possible for the star centers to be selected automatically without user input being required. For example, the star centers may be preconfigured.

The image segmentation system uses the star centers to implement a star convexity constraint as described above. It segments the image by globally optimizing 1104 a cost function (or energy formulation) which incorporates a star-convexity constraint using the plurality of star centers. The segmented image is stored 1106 and displayed 1108 and further user input may be received 1110 to add more star centers or move the existing star centers. For example the image segmentation can then be computed recursively using the further user input. The set of allowed shapes changes as the user adds brush strokes.

In some embodiments the image segmentation system is arranged to enable the shape constraints to change progressively as the user interacts, whilst ensuring that this provides an intuitive result. This is now explained with reference to FIGS. 12 and 13.

Figure 12:
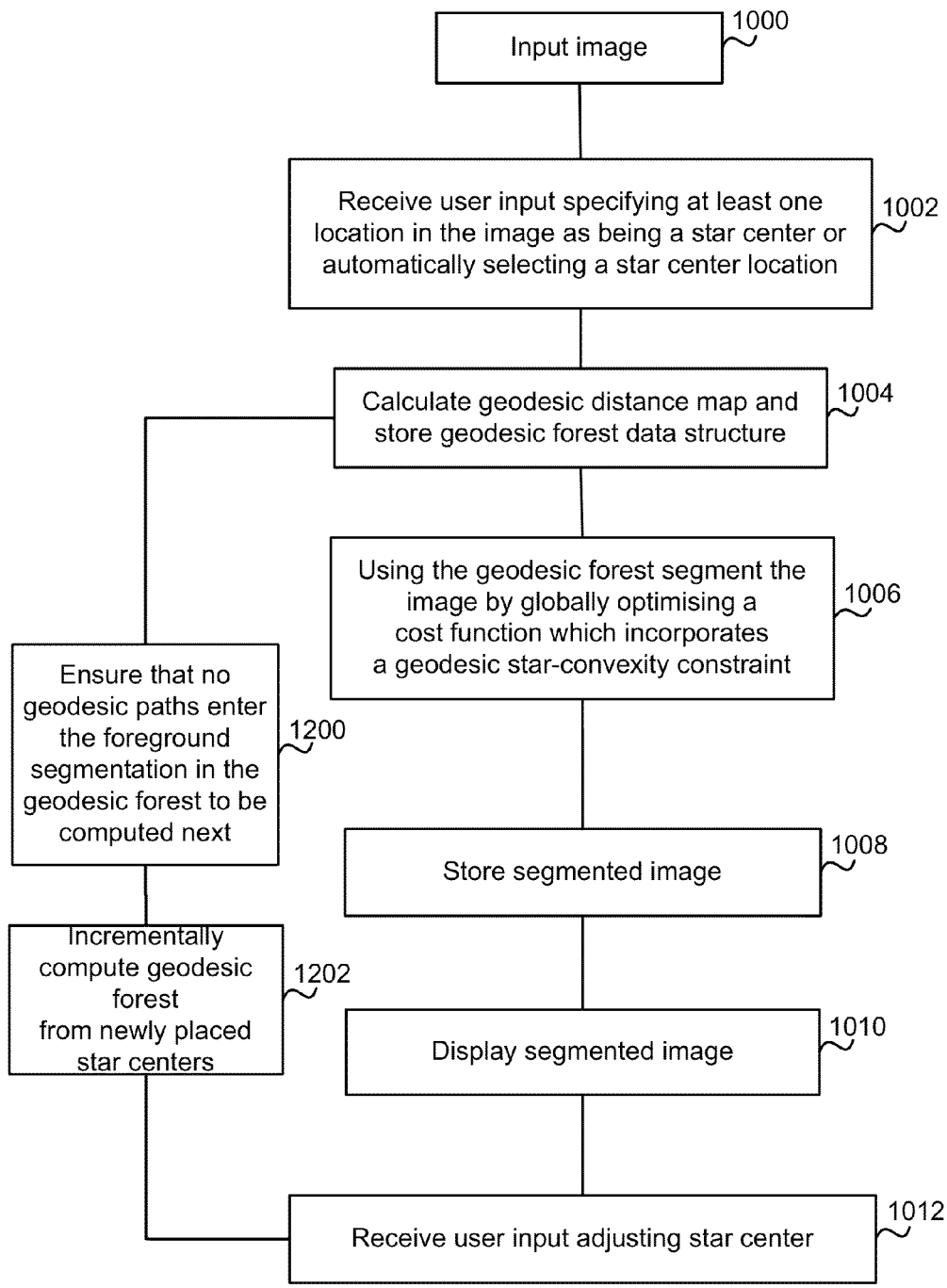
FIG. 12 is a flow diagram of an interactive method of image segmentation.
Figure 13:
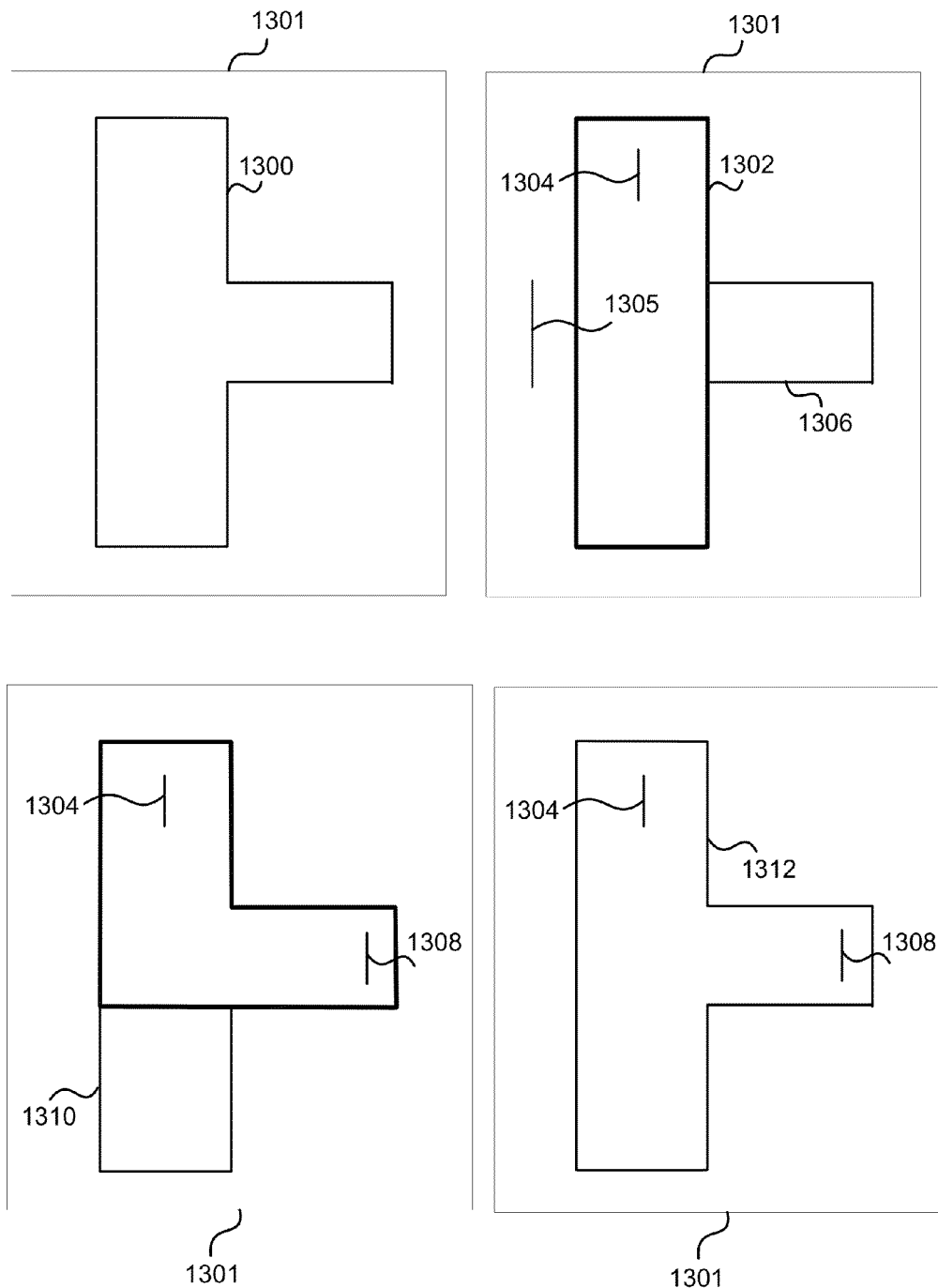
FIG. 13 is a schematic diagram of an interactive method of image segmentation.

Suppose an image 1301 depicts a T shape 1300 as depicted in FIG. 13 at 1300. The image is presented to a user at a graphical user interface and the user first places two initial brush strokes 1304 and 1305 where one of these brush strokes 1304 indicates a foreground and one 1305 indicates a background. The image segmentation system outputs a segmentation depicted as 1302 in FIG. 13. This segmentation is partially complete as region 1306 of the T shape is missing. Suppose the user now adds another brush stroke 1308. The segmentation system may then produce a segmentation depicted as 1310 in FIG. 13 which omits some of the T-bar shape and is not intuitive. The bottom of the T shape, which was visible to the star center on the top is now closer to the newly added star center at brush stroke 1308 and not visible to it. By using a sequential segmentation system as described with reference to FIG. 12 this is avoided and the result is the segmentation 1312 which correctly segments the whole T shape.

With reference to FIG. 12 an method at an image segmentation system comprises receiving an input image 1000 to be segmented. User input specifying at least one location in the image as being a star center is received 1002 (or a star center is automatically selected). A geodesic distance map is calculated 1004 and a geodesic forest data structure is stored. Using the geodesic forest the image is then segmented 1006 by globally optimizing a cost function (or energy formulation) which incorporates a geodesic star-convexity constraint). The segmented image is stored 1008 and displayed 1010. Further user input is received 1012 adjusting the star center or adding another star center. The segmentation system is arranged to incrementally compute the geodesic forest data structure from the newly placed star center(s) 1202. This ensures that the shape constraint only changes locally around the user edit. The system is also arranged to ensure that no geodesic paths enter the foreground segmentation in the geodesic forest to be computed after the edit 1200. This ensures that the segmentation is valid under the new star-convexity constraint obtained after the user edit. This may be enforced by adding an infinite cost on edges going from background to foreground in the geodesic computation.

As mentioned above, the parameter $y_g$ controls the weighting between geodesic and Euclidean. Setting $y_g=0$ results in a Euclidean shape (in a discrete domain), and $y_g=1$ relies purely on image gradients. The gradients can be rescaled such that the average gradient is the same as the average Euclidean distance between neighboring pixels. The optimal choice of $y_g$ can be image dependent. For objects with a complex shape a high $y_g$ may be selected in order to be close to a geodesic. In a real system the cost function also includes likelihoods. Images that have very complex appearances can lead to very noisy likelihoods. Such likelihoods can be a problem with high $y_g$ resulting in poor segmentation. A Euclidean ($y_g=0$) can behave better by ensuring that the shape does not bend arbitrarily and stays reasonably smooth. Thus the choice of an optimal $y_g$ depends on the quality of the likelihoods and the complexity of the object shape. In an example the user may be able to select $y_g$, for example using a scroll wheel, slider or other appropriate means.

More detail about computing a geodesic forest data structure is now given. A geodesic forest data structure may comprise a back-links map as now described. FIG. 14 illustrates schematically an intensity gradient map 1401 of an image and a geodesic distance map 1400 of the same image. The geodesic distance map 1400 shows a seed region 1402 (described in more detail below). The other lines in map 1400 are intended to represent geodesic shortest paths from various image elements (such as points x, y and z and others which are not labeled) to the seed region. The geodesic distance map in practice comprises many such paths, one from each image element to the seed region. However only some of these paths are depicted in 1400 for clarity.

As mentioned above, a seed region 1402 is illustrated in the geodesic distance map 1400. This seed region 1402 may be a single point in some examples. In other examples it may be a defined image region such as provided by a binary segmentation mask or in any other manner.

The intensity gradient map 1401 indicates regions in the image where the intensity values change rapidly and these are shown as lines 1403. The process of forming a geodesic forest corresponding to the image comprises finding, for each image element, the shortest geodesic distance to the seed region 1402. For point x in FIG. 14 this corresponds to a Euclidean distance from x to point x' because there are no high intensity gradients to cross. However, the shortest geodesic distance from point y to the seed region 1402 is a curved line from y to y' in FIG. 14 because the path needs to travel between the high intensity gradient lines 1403. This is also the case for image element z which has a curved shortest geodesic distance to z' on the seed region. In this way branches of image elements are formed as illustrated in FIG. 14. These branches form a tree which has a root at point y'. Many other such trees are formed in this way, each tree having a root which is a point on the seed region. Each image element is then a member of only one of the trees. The set of trees covers the entire image because each pixel belongs to at least one tree. The set of trees that covers the entire image is referred to herein as a geodesic forest. The number of trees in the forest is automatically selected by the geodesic forest engine.

Once the geodesic shortest distance to the seed region is computed for each image element a geodesic map may be stored having a distance value at each image element. Furthermore, a back-link value at each image element may also be stored FIG. 15 shows 9 back-link indices 1500. Starting from an image element if the next image element in the geodesic tree in the direction towards the root is in the direction north, then the back-link index 2 is stored at that image element location. This process is repeated so that a back-link index is stored at each image element location to form a back-links map. It is also possible to use 25 back link indices 1600 as illustrated in FIG. 16 or any other back-link index scheme.

In some embodiments the geodesic forest data structure comprises only the back-links map and the details of the back-link index scheme used are available to the image segmentation system. In other embodiments the geodesic forest data structure comprises only a geodesic map having a distance value for each image element. In other embodiments both the distances and the back-links are stored.

Figure 17:
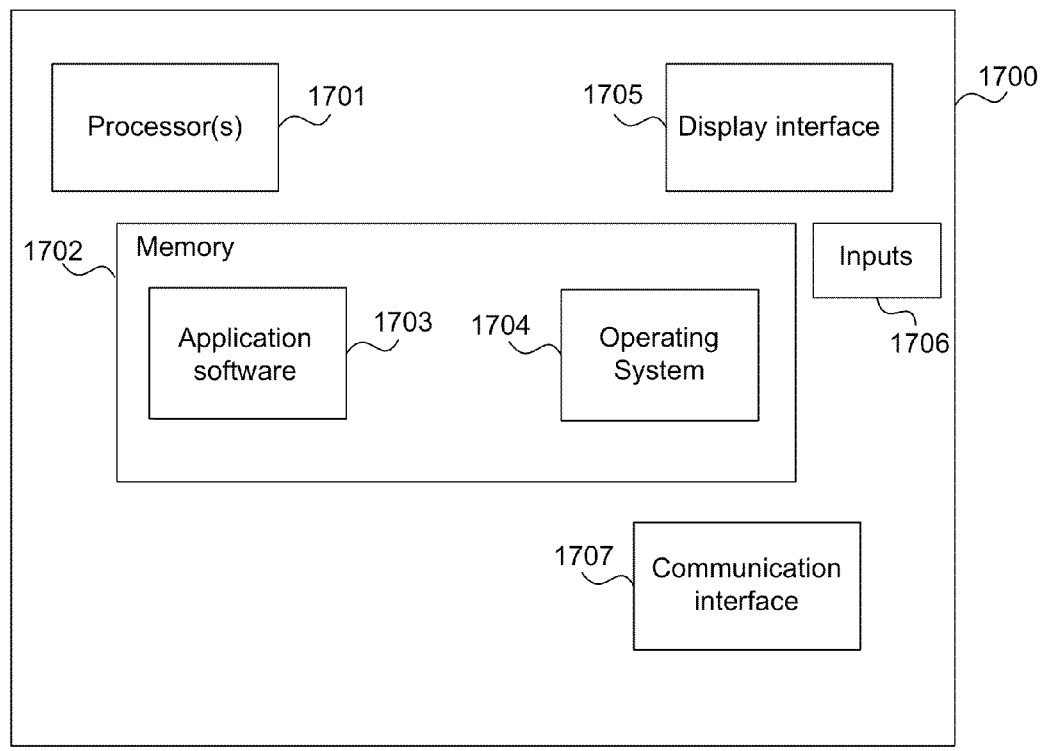
FIG. 17 illustrates an exemplary computing-based device in which embodiments of an image segmentation system may be implemented. Like reference numerals are used to designate like parts in the accompanying drawings.

FIG. 17 illustrates various components of an exemplary computing-based device 1700 which may be implemented as any form of a computing and/or electronic device, and in which embodiments of and image or video processing system using image segmentation may be implemented.

The computing-based device 1700 comprises one or more inputs 1706 which are of any suitable type for receiving media content, Internet Protocol (IP) input, images, videos, user input, audio input, or other types of input. The device also comprises communication interface 1707 to enable the device to be connected to other entities over a communications network.

Computing-based device 1700 also comprises one or more processors 1701 which may be microprocessors, controllers or any other suitable type of processors for processing computing executable instructions to control the operation of the device in order to carry out image segmentation. Platform software comprising an operating system 1704 or any other suitable platform software may be provided at the computing-based device to enable application software 1703 to be executed on the device.

The computer executable instructions may be provided using any computer-readable media, such as memory 1702. The memory is of any suitable type such as random access memory (RAM), a disk storage device of any type such as a magnetic or optical storage device, a hard disk drive, or a CD, DVD or other disc drive. Flash memory, EPROM or EEPROM may also be used. Although the memory is shown within the computing-based device 1700 it will be appreciated that the storage may be distributed or located remotely and accessed via a network or other communication link (e.g. using communication interface 1707).

The computing-based device 1700 also comprises a display interface 1705 arranged to output display information to a display device which may be separate from or integral to the computing-based device 1700. The display information may provide a graphical user interface. The display interface 1705 is also arranged to receive and process input from one or more devices, such as a user input device (e.g. a mouse or a keyboard). This user input may be used to specify star centers or indicate objects of interest in an image or video. In an embodiment the display device may also act as the user input device if it is a touch sensitive display device. The display interface 1705 may also output data to devices other than the display device, e.g. a locally connected printing device.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of segmenting an image into a foreground and a background comprising:
   receiving an image to be segmented;
   obtaining at least one star center being a location in the image;
   using the star center to calculate a geodesic distance map corresponding to the image, the geodesic distance map comprising a geodesic shortest path distance from each image element of the image to the star center;
   specifying an energy function representing a problem of segmenting the image;

using the geodesic distance map, optimizing the energy function to obtain the foreground and background, the energy function incorporating a geodesic star-convexity constraint.

2. A method as claimed in claim 1 wherein the geodesic star-convexity constraint is that, for any point p inside the foreground, all points on a geodesic shortest path between the star center and p also lie inside the foreground.

3. A method as claimed in claim 1 comprising obtaining a plurality of star centers and wherein the geodesic star-convexity constraint is that, for any point p inside the foreground, all points on a geodesic shortest path between the nearest star center and p also lie inside the foreground.

4. A method as claimed in claim 3 wherein the star centers are discrete.

5. A method as claimed in claim 3 wherein the star centers form a line segment.

6. A method as claimed in claim 1 wherein the energy function is optimized using a graph cut process.

7. A method as claimed in claim 1 wherein the at least one star center is obtained from user input specifying at least one element of the image which is in the foreground.

8. A method as claimed in claim 7 which further comprises displaying the image and the foreground and receiving user input specifying a second star center.

9. A method as claimed in claim 8 which comprises incrementally computing the geodesic distance map using the second star center and using the incrementally computed geodesic distance map to re-optimize the energy function.

10. A method as claimed in claim 8 which further comprises re-computing the geodesic distance map such that no geodesic paths enter the foreground and re-optimizing the energy function using the re-computed geodesic distance map.

11. A method as claimed in claim 1 wherein the at least one star center is pre-specified.

12. A computer-implemented method of segmenting an image into a foreground and a background comprising:
storing an image to be segmented in memory;
obtaining a plurality of star centers each being a location in the image;
arranging a processor to specify an energy function representing a problem of segmenting the image, the energy function incorporating a star-convexity constraint based on the plurality of star centers;
using the processor to optimize the energy function to obtain the foreground and background.

13. A method as claimed in claim 12 wherein the star-convexity constraint is that, for any point p inside the foreground, all points on a shortest path between the nearest star center and p also lie inside the foreground.

14. A method as claimed in claim 12 wherein the star centers are discrete.

15. A method as claimed in claim 12 wherein the star centers form a line segment.

16. An image segmentation apparatus comprising:
a memory arranged to store an image to be segmented at least into a foreground and a background;
an input arranged to obtain a plurality of star centers each being a location in the image;
a processor arranged to use the star centers to calculate a geodesic distance map corresponding to the image, the geodesic distance map comprising a geodesic shortest path distance from each image element of the image to a nearest one of the star centers;
the processor being arranged to specify an energy function representing a problem of segmenting the image;
the processor being arranged to use the geodesic distance map to optimize a cost function and obtain the foreground and the background, the cost function incorporating a geodesic star-convexity constraint which is that, for any point p inside the foreground, all points on a geodesic shortest path between the nearest star center and p also lie inside the foreground.

17. An apparatus as claimed in claim 16 wherein the input comprises a graphical user interface arranged to receive user input specifying at least a plurality of image elements which are in the foreground.

18. An apparatus as claimed in claim 17 which further comprises an output arranged to display the foreground and background and wherein the graphical user interface is arranged to receive input adding a further star center.

19. An apparatus as claimed in claim 18 wherein the processor is arranged to change the star-convexity constraint only locally around the further star center.

20. An apparatus as claimed in claim 19 wherein the processor is arranged to incrementally compute the geodesic distance map using the further star center and to use the incrementally computed geodesic distance map to re-optimize the cost function.

* * * * *